(12) United States Patent
Balannik et al.

(10) Patent No.: US 8,918,083 B2
(45) Date of Patent: Dec. 23, 2014

(54) SYSTEM AND METHOD TO MANAGE VISUAL VOICE MAIL MESSAGES

(75) Inventors: Vadim Balannik, Rolling Meadows, IL (US); Patrick D. Ellis, Rolling Meadows, IL (US)

(73) Assignee: Blackberry Limited, Waterloo (CA)

( * ) Notice: Subject to any disclaimer, the term of this patent is extended or adjusted under 35 U.S.C. 154(b) by 412 days.

(21) Appl. No.: 13/276,169

(22) Filed: Oct. 18, 2011

(65) Prior Publication Data

US 2012/0276877 A1 Nov. 1, 2012

Related U.S. Application Data

(60) Provisional application No. 61/393,977, filed on Oct. 18, 2010.

(51) Int. Cl.
| | |
|---|---|
| H04L 12/58 | (2006.01) |
| H04M 11/10 | (2006.01) |
| H04W 4/00 | (2009.01) |
| H04M 3/42 | (2006.01) |
| H04M 1/57 | (2006.01) |
| H04M 1/663 | (2006.01) |
| H04M 1/725 | (2006.01) |
| H04W 4/12 | (2009.01) |

(52) U.S. Cl.
CPC ............ *H04M 1/72547* (2013.01); *H04M 1/57* (2013.01); *H04M 1/663* (2013.01); *H04M 1/7255* (2013.01); *H04W 4/12* (2013.01)
USPC ..................... 455/412.1; 455/412.2; 455/413; 455/466; 455/415; 455/414.1

(58) Field of Classification Search
CPC ..................................................... H04M 3/533

USPC ......... 455/412.1–412.2, 413, 415, 466, 414.1
See application file for complete search history.

(56) References Cited

U.S. PATENT DOCUMENTS

| | | |
|---|---|---|
| 5,666,397 A | 9/1997 | Lamons et al. |
| 5,825,852 A | 10/1998 | DePond et al. |

(Continued)

FOREIGN PATENT DOCUMENTS

| | | |
|---|---|---|
| FR | 2935506 A1 | 3/2010 |
| WO | 9511563 A1 | 4/1995 |

(Continued)

OTHER PUBLICATIONS

BuzzOff—The Best Call Filter app. Block unwanted callers and do not allow caller to leave voicemail.

(Continued)

*Primary Examiner* — Opiribo Georgewill
*Assistant Examiner* — Dung Hong
(74) *Attorney, Agent, or Firm* — Novak Druce Connolly Bove + Quigg LLP

(57) ABSTRACT

A system and method for managing voice mail messages associated with a mobile device. The method can include receiving, by a processor of the mobile device, at least one identifier associated with a sending device that initially stored, external to the mobile device, a visual voice mail message associated with the mobile device. The processor can compare the at least one identifier with one or more lists of predetermined identifiers stored on the mobile device. The one or more lists include at least one of a list of approved predetermined identifiers and a list of disapproved predetermined identifiers. Based on the comparison, appropriated actions can occur based on rules stored on the mobile device.

13 Claims, 11 Drawing Sheets

(56) References Cited

U.S. PATENT DOCUMENTS

| | | |
|---|---|---|
| 6,061,512 A | 5/2000 | Lin |
| 6,091,805 A | 7/2000 | Watson |
| 6,215,863 B1 | 4/2001 | Bennett et al. |
| 6,929,549 B1 | 8/2005 | Yamada |
| 2003/0229722 A1* | 12/2003 | Beyda ............ 709/310 |
| 2005/0164720 A1* | 7/2005 | Huang ............ 455/466 |
| 2006/0246878 A1* | 11/2006 | Khoury ............ 455/412.2 |
| 2006/0268750 A1 | 11/2006 | Weiner |
| 2007/0192490 A1* | 8/2007 | Minhas ............ 709/226 |
| 2008/0207176 A1 | 8/2008 | Brackbill et al. |
| 2008/0260118 A1 | 10/2008 | Lyle |
| 2009/0154663 A1 | 6/2009 | Thaper et al. |
| 2009/0154668 A1 | 6/2009 | Hao et al. |
| 2009/0181641 A1 | 7/2009 | Fiatal |
| 2009/0209243 A1* | 8/2009 | Brown et al. ............ 455/418 |
| 2009/0298469 A1 | 12/2009 | Kim et al. |
| 2010/0093319 A1 | 4/2010 | Sherman |
| 2010/0094943 A1 | 4/2010 | Leuca |
| 2010/0128858 A1 | 5/2010 | Wang |
| 2010/0149300 A1 | 6/2010 | Zubas et al. |
| 2010/0150324 A1* | 6/2010 | Albert et al. ............ 379/88.22 |
| 2010/0151834 A1 | 6/2010 | Kalbag |
| 2010/0158211 A1 | 6/2010 | Chatterjee et al. |
| 2010/0173605 A1 | 7/2010 | Moraes |
| 2010/0174790 A1* | 7/2010 | Dubs et al. ............ 709/206 |
| 2010/0211692 A1 | 8/2010 | Katis et al. |
| 2010/0226346 A1 | 9/2010 | Caldwell et al. |
| 2010/0235787 A1 | 9/2010 | Couse et al. |

FOREIGN PATENT DOCUMENTS

| | | |
|---|---|---|
| WO | 0059196 A1 | 10/2000 |
| WO | 0131610 A1 | 5/2001 |
| WO | 03025875 A1 | 3/2003 |
| WO | 2006117693 A2 | 11/2006 |
| WO | 2007081519 A2 | 7/2007 |
| WO | 2007141716 A2 | 12/2007 |
| WO | 2008063264 A1 | 5/2008 |
| WO | 2009136003 A1 | 11/2009 |

OTHER PUBLICATIONS

The International Search report mailed May 10, 2012, in corresponding PCT patent application No. PCT/US2011/056756.

Written Opinion of the International Searching Authority mailed May 10, 2012, in corresponding PCT patent application No. PCT/US2011/056756.

* cited by examiner

SYSTEM AND METHOD TO MANAGE VISUAL VOICE MAIL MESSAGES

CLAIM OF PRIORITY

This application claims the benefit of U.S. Provisional Patent Application 61/393,977, entitled SYSTEM AND METHOD TO MANAGE VISUAL VOICE MAIL MESSAGES, 61/393,977, by Balannik et al., filed Oct. 18, 2010, the entire contents of which are incorporated herein by reference.

FIELD OF THE INVENTION

This disclosure generally relates to mobile devices, and more particularly to managing visual voice mail messages.

BACKGROUND

There are times when a user of a mobile device can receive voice mail messages from unwanted sources. For example, telemarketers, recruiters or headhunters, a random caller who has a wrong number, or someone that keeps calling the user of the mobile device. As a result of these calls, the caller may leave messages which can consume a user's allocated space on a server, such as a visual voice mail server or any other server for storing such messages. Typically, a user's allocated space on the server is limited and such messages may eventually block new messages from being stored in the allocated space or can lead to additional costs to the user. For example, some systems or service plans may charge a user to download messages or if the user exceeds a threshold. As a result, there is a need to reduce or restrict costs associated with undesirable messages consuming a user's allocated space for messages. Thus there is a need to reduce the number of messages stored in the allocated space. One means to reduce the number of messages is to automatically delete messages from users who are considered undesirable depositors.

BRIEF DESCRIPTION OF THE DRAWINGS

Implementations of the present disclosure will now be described, by way of example only, with reference to the attached Figures, wherein.

DETAILED DESCRIPTION

Figure 1A:
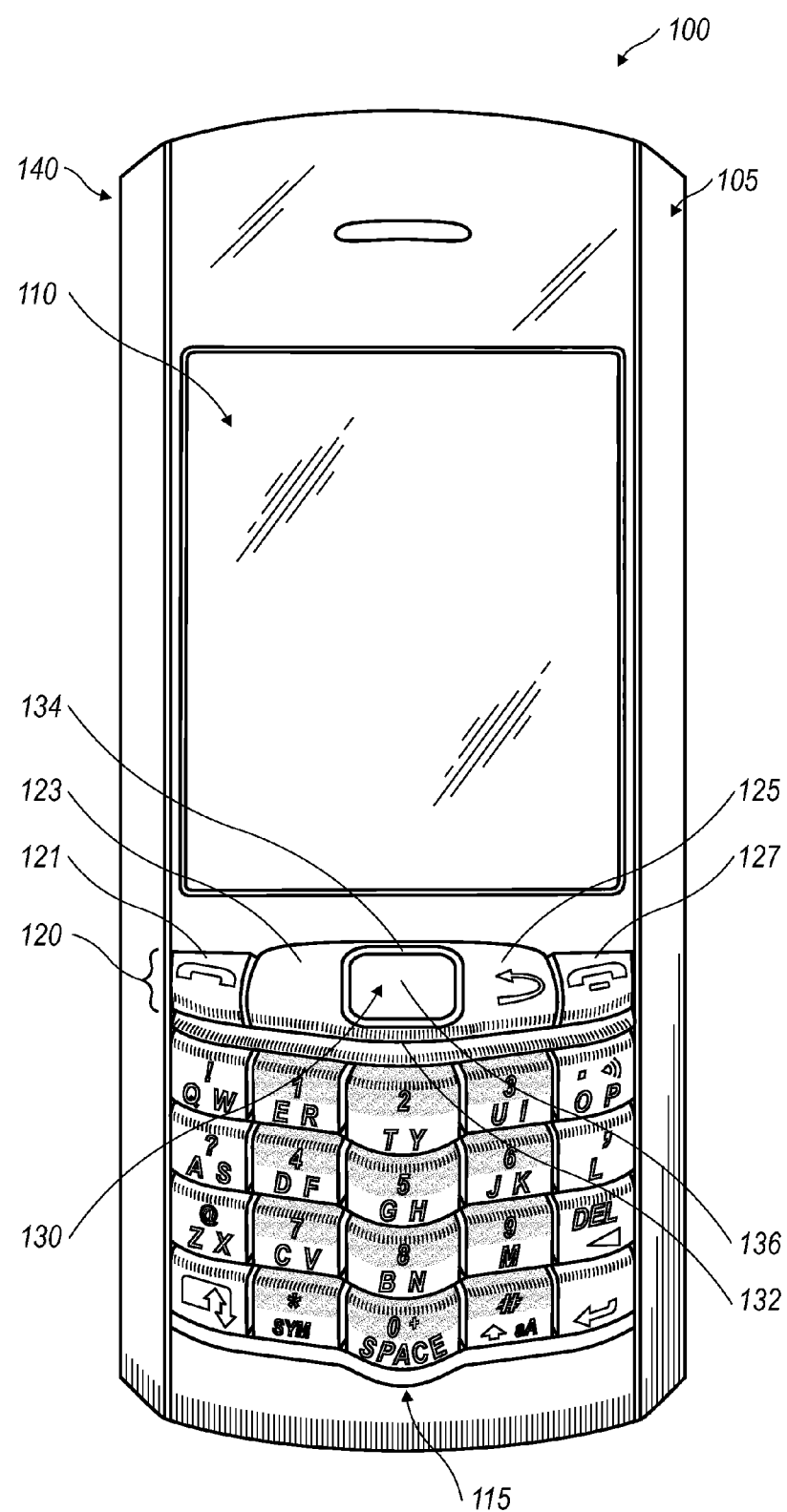
FIG. 1A is a front view of a mobile device having an optical navigation assembly in accordance with an exemplary embodiment of the disclosure.

As will be appreciated for simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. The word "coupled" is defined as connected, whether directly or indirectly through intervening components, and is not necessarily limited to physical connections. The term "communicatively coupled" is defined as connected, whether directly or indirectly through intervening components, is not necessarily limited to a physical connection, and allows for the transfer of data. The term "mobile device" is defined as any electronic device that is capable of at least accepting information entries from a user and includes the device's own power source. A "wireless communication" means communication that occurs without wires using electromagnetic radiation. The term "memory" refers to transitory memory and non-transitory memory. For example, non-transitory memory can be computer readable media implemented as Random Access Memory (RAM), Read-Only Memory (ROM), flash, ferromagnetic, phase-change memory, and other non-transitory memory technologies. A "visual voice mail message" is defined as a voice message; a video message; a fax or facsimile message; a system message; a transcription of a voice message, a video message, or a fax message; information associated with a voice message, video message, fax message, or system message; or any combination thereof. A system message can be a message sent from a visual voice mail message system, for example, a voice mail system or cell phone system. For example, the system message can be a text message (such as a non-MMS message or non-SMS message, for example, "Visual Voice Mail Inbox is Full") or audio message. The voice message can include information associated with the voice message, an audio component, or both. The video message can include information associated with the video message, a video component, an audio component, or any combination thereof. The facsimile message can include information associated with the fax message, an image component, or both.

The present disclosure provides a system and method to manage voice mail messages associated with a mobile device. The system and method can be rule based with the rules being part of a visual voice mail message application stored on a mobile device. The rules can determine how to manage or control a visual voice mail message from a known depositor, an unknown depositor, non-number (blocked number), or any combination thereof. A message from a visual voice mail server can include one or more identifiers identifying the sending device associated with the visual voice mail message. The identifier can identify the sending device, person or company associated with the sending device, or any combination thereof. The one or more identifiers can include telephone numbers, fax numbers, Mobile Identifier Numbers (MIN), contact names, anonymous source (such as blocked numbers), or any combination thereof. Stored identifiers can be stored in one or more address books, one or more lists, one or more white lists, one or more black lists, or any combination thereof. The one or more stored identifiers can include telephone numbers, fax numbers, Mobile Identifier Numbers (MIN), contact names, anonymous source (such as blocked numbers) source, or any combination thereof. The one or more address books can include one or more options for managing a visual voice mail message from a known identifier. The one or more address books can include a corporate address book, a personal contact address book, or any address book associated with the mobile device 100.

The one or more lists can include a list of stored identifiers for managing a visual voice mail message from a known identifier, unknown identifier, anonymous identifier, or any combination thereof. The one or more white lists can include a list of predetermined identifiers for managing how a visual voice mail message that the user of the mobile device may treat more positively compared to stored identifiers listed on the black list. The one or more black lists can include a list of stored identifiers for managing a visual voice mail message that the user of the mobile device may treat more negatively compared to stored identifiers on the white list.

The mobile device can compare the identifier associated with the sending device with the one or more stored identifiers to manage the associated visual voice mail message. Each list, for example, white list or black list, can include one or more rules associated with the list to take a specific action. Exemplary actions can include: downloading a visual voice mail message having a notification message and one of a voice message, video message, fax message, or system message to the mobile device; downloading only a notification message, without a visual message, video message, fax message, or system message, to the mobile device; maintaining the stored visual voice mail message on a source external to the mobile device, deleting the stored visual voice mail message from a source external to the mobile device; emailing the visual voice mail message having a notification message and one of a voice message, video message, fax message, and system message to the mobile device; and downloading a notification message to the mobile device and deleting the stored visual voice mail message from a source external to the mobile device.

Referring to FIG. 1, a block diagram of a mobile device in a communication network in accordance with an exemplary implementation is illustrated. While the illustrated embodiment depicts the mobile device 100 as a "smart phone," it will be appreciated by those skilled in the art that the term "mobile device" 100 herein can be defined to encompass a personal digital assistant (PDA), a laptop computer, a tablet computer, or any other network access device configured for communicating with a communications network. In accordance with an aspect of the disclosure, the mobile device 100 can comprise a housing with a "unibody" structure, also known to those skilled in the art as a "candy-bar" configuration. In alternate embodiments, the mobile device 100 can include a "clamshell" or a "slider" configuration or the like.

In the exemplary embodiment, the mobile device 100 can comprise a front face 105 having a display 110 located above an input user interface, such as a keyboard 115. The keyboard 115 can comprise a plurality of keys that are actuable to provide data input via tactile pressure. The mobile device 100 can further comprise a row of programmable keys 120 configured to perform selected functions as is known in the art. For example, programmable keys 120 can include a call send key 121, a menu key 123, an escape key 125 and a call end key 127, and the like.

According to one embodiment of the disclosure, the mobile device 100 can include a navigation assembly 130 that generates signals for navigating through content presented on a graphical user interface, such as the display 110. The navigation assembly 130 is advantageously structured to enable two-dimensional or three-dimensional navigation on the display 110, among enabling other functions. For example, the navigation assembly 130 can include one or more sensor arrays having capacitive, optical or like sensors that are responsive to finger pressure as is well known. The sensor arrays generate signals for instructing cursor movement in substantially any direction relative to the boundaries of the display 110.

The navigation assembly 130 can include a cover 132 that is disposed on the front face 105 of the mobile device 100. This location for the assembly allows the navigation assembly 130 to be thumb or finger-actuable, in a manner similar to the keys on the keyboard 115 and the programmable keys 120. The cover 132 can be dimensioned and configured to overlay the navigation assembly 130 and the programmable keys 123, 125, as well as other adjacent structures. The cover 132 can include at least one decorative ring 134 that defines a tracking window 136 and outlines a perimeter of the underlying sensor arrays. As a result, users of the mobile device 100 receive a visual indication of the sensing area for the navigation assembly 130.

The mobile device 100 can include a reduced QWERTY keyboard 132. Alternatively, the mobile device 100 can include other keyboard configurations, including a full size keyboard or a virtual keyboard provided on a touch screen display (not shown). Each key of the keyboard 115 can be associated with at least one alphabetic character, numeral or command, among other data items. The commands can include a space command or a return command, among other commands. The plurality of the keys can include alphabetic characters and can be arranged in a variety of known keyboard layouts, including a QWERTY layout (as shown in FIG. 1), a QZERTY layout, a QWERTZ layout, an AZERTY layout, a Dvorak layout, a Russian keyboard layout, a Chinese keyboard layout, or other known layouts to enable data input to the device. These layouts are provided by way of example. Other known layouts are considered to be obvious variations thereof and thus within the scope of this disclosure. The keyboard layout can be selected based on a desired geographical region of operation. Additionally, the keyboard 115 can be interchangeable such that a user can switch between keyboard layouts.

The mobile device 100 can include a body 140 sized to facilitate hand-held use. The display 110 can be provided on the front face 105 of the body 140 to enable data display and to facilitate sending and receiving communications through a network, including voice and data messages. The mobile device 100 can include peripherals, such as a camera or video recorder to enable recording digital images.

Figure 1B:
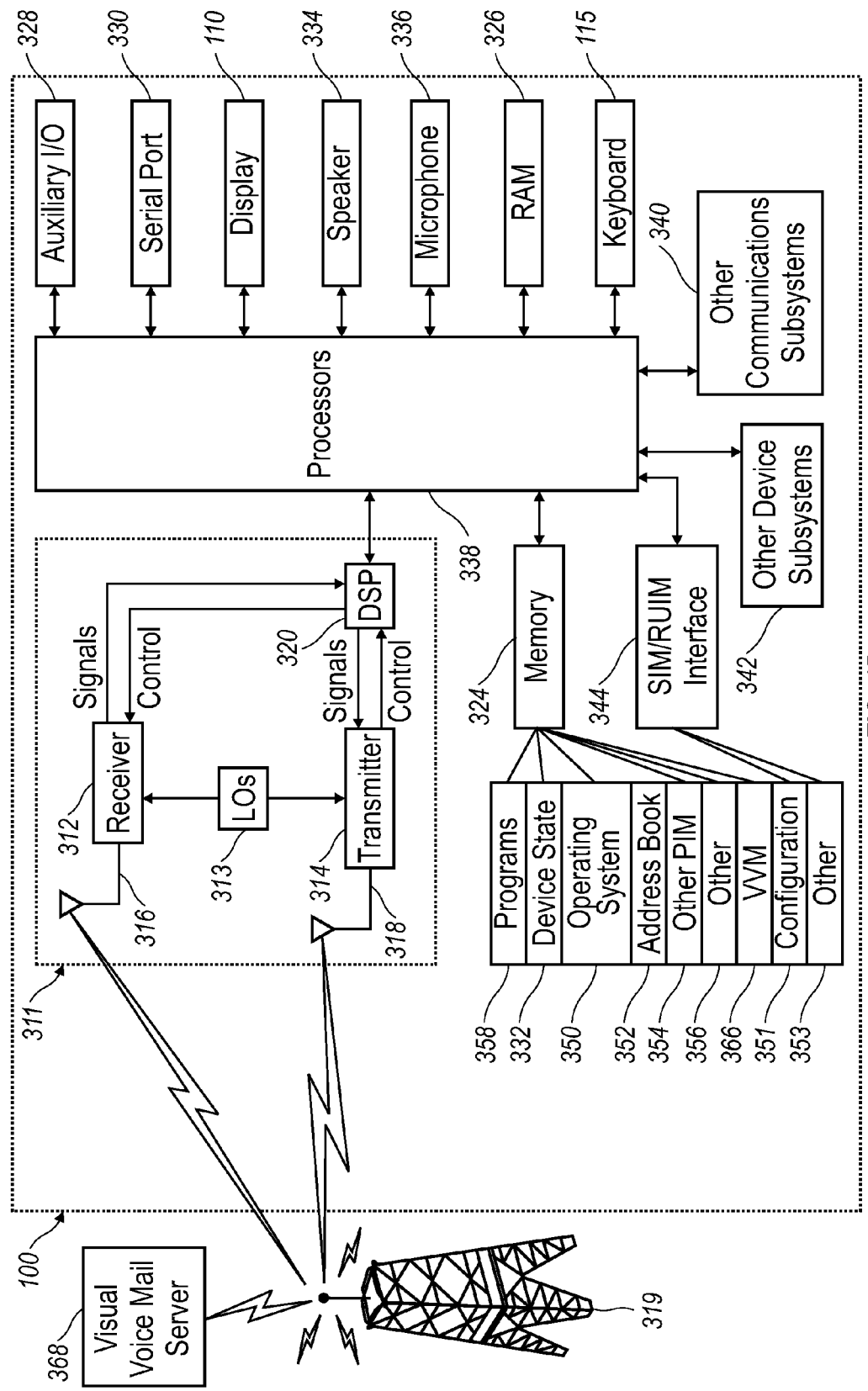
FIG. 1B is a block diagram of a mobile device in a communication network in accordance with an exemplary embodiment of the disclosure.

Referring to FIG. 1B, a block diagram of a mobile device in a communication network in accordance with an exemplary embodiment of the disclosure is illustrated. One of ordinary skill in the art will readily appreciate that additional elements and modifications can be necessary to make the mobile device 100 work in particular network environments. The mobile device 100 generally comprises a processor or microprocessor 338 and a communication subsystem 311 for communicating with a wireless network 319. The microprocessor 338 can be coupled to a serial port (for example, a Universal Serial Bus port) 330 that facilitates communication with other devices or systems via the serial port 330. A display 110 can be communicatively coupled to the microprocessor 338 to facilitate display of information to an operator of the mobile device 100. If the mobile device 100 is equipped with a keyboard 115—which can be physical or virtual (for example, displayed as images of keys rendered on a touch screen)—the keyboard 115 provides a user interface for generating external commands/controls to the microprocessor 338. The mobile device 100 can comprise one or more speakers 334, and one or more microphones 336, which are connected to the microprocessor 338 in a conventional manner. Other communication subsystems 340 and other mobile device subsystems 342 communicate with the microprocessor 338. An example of a communication subsystem 340 is a short-range communication system such as a BLUETOOTH® communication module or a WI-FI® communication module (a communication module in compliance with IEEE 802.11b, g or n) and associated circuits and components. Additionally, the microprocessor 338 can perform operating system functions and can execute programs or software applications on the mobile device 100. In some implementations, not all of the above components are included in the mobile device 100. An auxiliary I/O subsystem 328 can include one or more different navigation tools (multi-directional or single-directional), external I/O devices such as keyboards, and other subsystems capable of providing input or receiving output from the mobile device 100.

The auxiliary I/O subsystem 328 can take the form of a variety of different navigation tools (multi-directional or single-directional) such as an optical navigation assembly or tool as illustrated in the exemplary embodiment shown in FIG. 1. In other embodiments, auxiliary I/O subsystem 328 can include a trackball, a thumbwheel, a navigation pad, a joystick, a touch-sensitive interface, or other I/O interface. The navigation tool can be located on a front face 105 of the mobile device 100 or can be located on any exterior surface of the mobile device 100. Other auxiliary I/O subsystems can include external display devices and externally connected keyboards (not shown). While the above examples have been provided in relation to the auxiliary I/O subsystem, other subsystems capable of providing input or receiving output from the mobile device 100 are considered within the scope of this disclosure. Additionally, other keys can be placed along the side of the mobile device 100 to perform selected functions and can include escape keys, volume control keys, scrolling keys, power switches, or user programmable keys, and can likewise be programmed accordingly.

The mobile device 100 can be equipped with components to enable operation of various programs. A memory 324 can provide storage for the operating system 350, device programs 358, device state data 332, and so forth. The operating system 350 can be generally configured to manage other programs 358 that can be stored in the memory 324 and can be executable on the processor 338. The operating system 350 can handle requests for services made by programs 358 through predefined program interfaces. More specifically, the operating system 350 can typically determine an order in which the programs 358 are executed on the processor 338. The operating system 350 can determine an execution time allotted for each program 358, can manage sharing of the memory 324 among the programs 358, can handle input and output to and from other device subsystems 324, and so forth. In addition, users can interact directly with the operating system 350 through a user interface, typically including the keyboard 115 and the display 110. The operating system 350, programs 358, data, and other information can be stored in the memory 324, such as RAM 326, read-only memory (ROM), or another suitable storage element (not shown). An address book 352, an other personal information manager (Other PIM) 354, and other information 356 can also be stored.

The mobile device 100 can be enabled for two-way communication within voice, data, or voice and data communication systems. A Subscriber Identity Module (SIM) or Removable User Identity Module (RUIM) can be utilized to authorize communication with the communication network 319. A SIM/RUIM interface 344 provided within the mobile device 100 can interface a SIM/RUIM card (not shown) to the microprocessor 338 and can facilitate removal or insertion of a SIM/RUIM card. The SIM/RUIM card can include a memory and can hold key configurations 351 and other information 353, such as identification and subscriber related information. The mobile device 100 can be equipped with an antenna 318 for transmitting signals to the communication network 319 and another antenna 316 for receiving communication from the communication network 319. Alternatively, a single antenna (not shown) may be utilized to both transmit and receive signals. The communication subsystem 311 can include a transmitter 314 and receiver 312, one or more antennae 316, 318, local oscillators (LOs) 313 and a processing module 320, such as a digital signal processor (DSP).

The mobile device 100 can include a touch-sensitive display or touch screen that includes one or more touch location sensors, an overlay, and a display 110, such as a liquid crystal display (LCD) or light emitting diode (LED) display. The touch location sensor(s) can be a capacitive, resistive, infrared, surface acoustic wave (SAW), or other type of touch-sensitive sensor and can be integrated into the overlay. The overlay, or cover, can be comprised of laminated glass, plastic, or other suitable material(s) and is advantageously translucent or transparent. A touch, or touch contact, can be detected by the touch screen and processed by the processor 605, for example, to determine a location of the touch. Touch location data can include a center of the area of contact or the entire area of contact for further processing. A touch can be detected from a contact member, such as a body part of a user, for example a finger or thumb, or other objects, for example a stylus, pen, or other pointer, depending on the nature of the touch location sensor.

The mobile device 100 can include a visual voice mail message application (VVM) 366 which can manage visual voice mail messages. The visual voice mail message application 366 can be stored in the flash memory 324 of the mobile device 100 and the microprocessor 338 can execute the visual voice mail message application 366. The microprocessor 338 can communicate with one or more visual voice mail servers 368. The visual voice mail server 368 can be a single server or multiple servers (for example a different server for different systems: voicemail, videos, faxes, or any combination thereof). Each system can be provided by a different carrier. The visual voice mail server 368 can store visual voice mail messages in one or more storage devices (not shown) associated with the visual voice mail server 368. For example, the one or more storage devices associated with the visual voice mail server 368 can be one or more storage devices on the visual voice mail server 368, one or more storage devices communicatively coupled to the visual voice mail server 368, or any combination thereof. The visual voice mail server 368 can receive one or more visual voice mail messages that are associated with a mobile device 100, for example voice messages addressed or directed to the mobile device 100. According to rules associated with the visual voice mail message application 366, visual voice mail messages can be received at the visual voice mail server 368 and managed in accordance with the rules stored on the mobile device 100. The visual voice mail message can include information associated with a voice message, video message, fax message, system message, a transcription of a voice message or video message, or any combination thereof. The visual voice mail message and information associated with the visual voice mail message can be stored or deposited in one or more storage devices associated with the visual voice mail server 368. The information associated with a voice mail message can include, but is not limited to, the time the visual voice mail message was stored, the date the visual voice mail message was stored, the number of the device that stored the visual voice mail message, the name of the depositor of the visual voice mail message, and the length of visual voice mail message. The length of a voice mail message can include the number of seconds of a voice message or video message and the number of pages for a fax message. The transcription of a voice message, a video message or a fax message can convert the message (for example, the audio of a voice message or video message, or images of a fax message, into a readable format, such as an email or text.

Figure 2A:
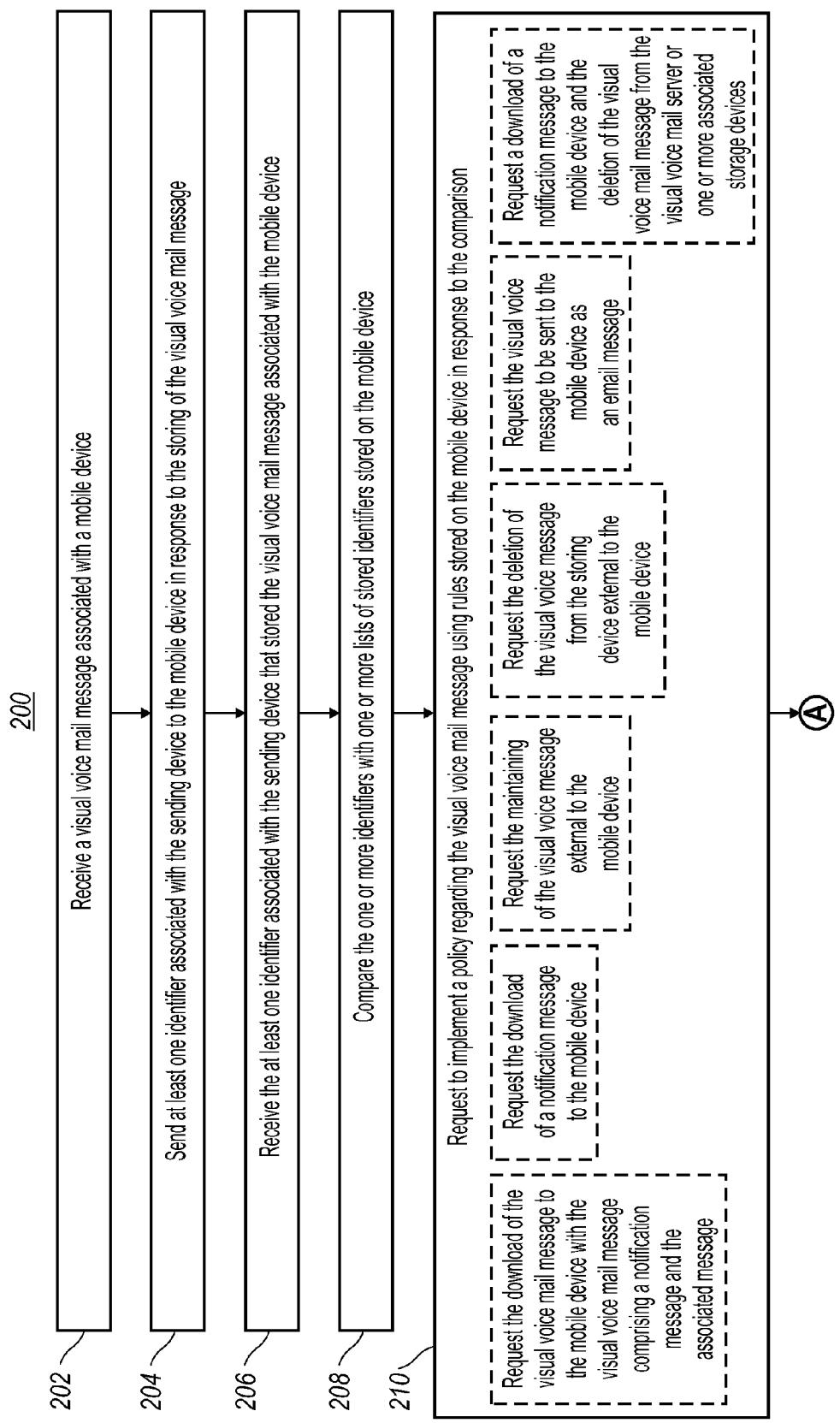
FIGS. 2A-2B are a flowchart of a method of managing visual voice mail messages for a visual voice mail message application in accordance with an exemplary embodiment of the disclosure.
Figure 2B:
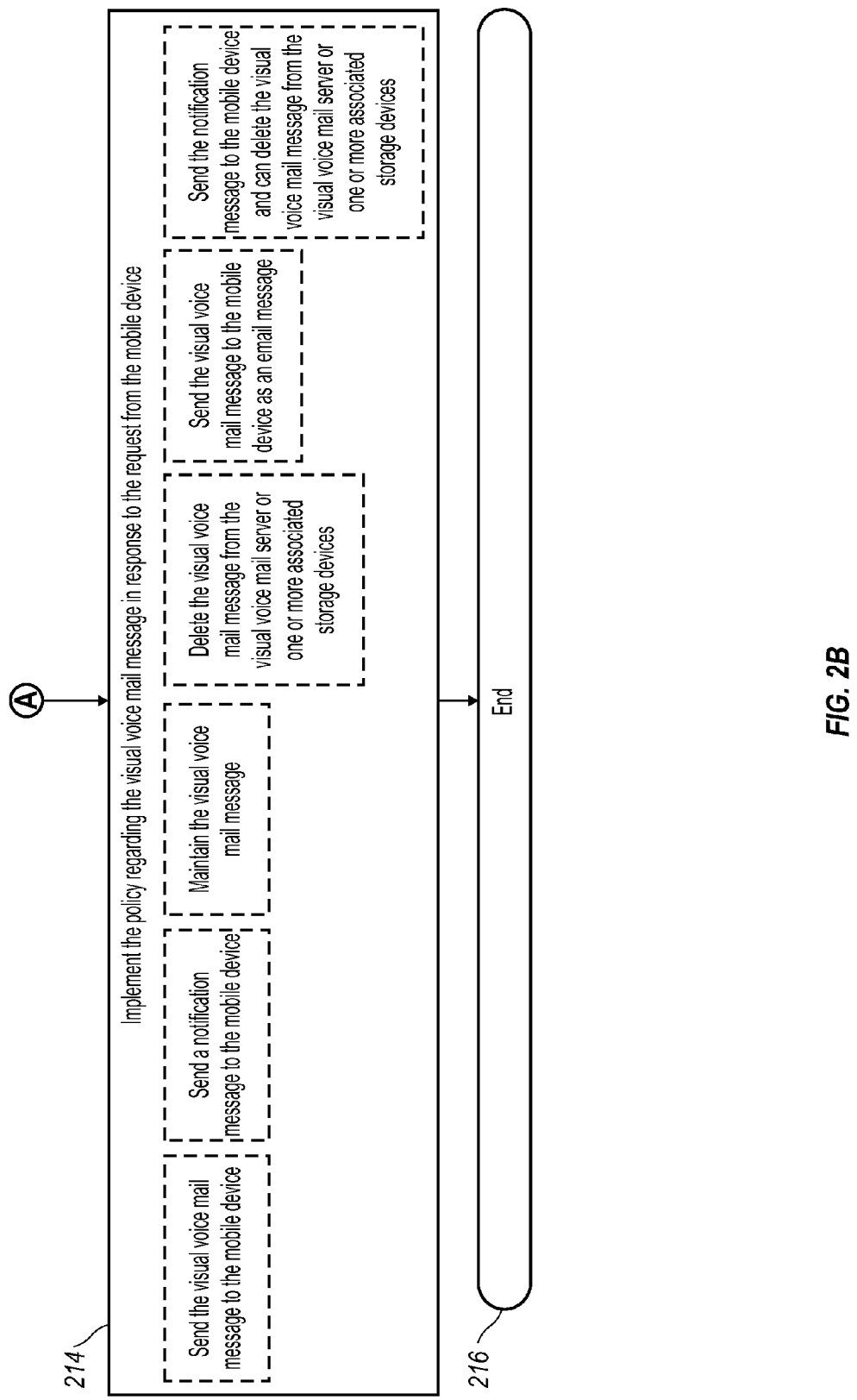

Referring to FIGS. 2A-2B, a flowchart of a method of managing a visual voice mail message in accordance with an exemplary implementation is illustrated. The exemplary method 200 is provided by way of example, as there are a variety of ways to carry out the method. The method 200 described below can be carried out using the communication devices and communication network shown in FIG. 1 by way of example, and various elements of these figures are referenced in explaining exemplary method 200. Each block shown in FIG. 2 represents one or more processes, methods or subroutines, carried out in exemplary method 200. The exemplary method 200 can begin at block 202.

At block 202, a visual voice mail server can receive a visual voice mail message associated with a mobile device. For example, a sending device can send a visual voice mail message that is stored in one or more storage devices associated with the visual voice mail server 368. Thus, the visual voice mail message is stored externally to the mobile device 100, for example, on the visual voice mail server 368 or one or more storage devices associated with the visual voice mail server 368. The sending device can be the device that was used to store the visual voice mail message. The sending device can be, but is not limited to, a mobile device, a landline phone, a computer, a fax machine, or a system server. A system server can be a server providing a service to the mobile device 100, such as voice mail, video, phone, or fax service. The visual voice mail message can be stored for several reasons, such as the mobile device 100 being powered off or unavailable, or the user sending to the visual voice mail server 368 a command to ignore a call or redirect the call. After the visual voice mail message is received, the method 200 can proceed to block 204.

At block 204, the visual voice mail server can send at least one identifier associated with the sending device to the mobile device in response to the storing of the visual voice mail message. The at least one identifier can identify the sending device, an unknown identifier, an anonymous identifier, or any combination thereof. The visual voice mail server 368 can parse an identifier associated with the sending device from information associated with the visual voice mail message. In one or more embodiments, the visual voice mail server 368 can exchange one or more commands with the mobile device 100 to obtain the identifier. For example, the visual voice mail server 368 can provide a phone number to the mobile device 100 to obtain a contact name associated with the phone number and can send the contact name as the identifier. If the sending device blocks caller id, the visual voice mail server 368 can send an appropriate identifier, such as "blocked number" (e.g., unknown) or "anonymous." After sending the at least one identifier to the mobile device 100, the method 200 can proceed to block 206.

At block 206, a mobile device can receive the at least one identifier associated with the sending device that stored the visual voice mail message associated with the mobile device. For example, a processor 338 of a mobile device 100 can receive the at least one identifier. After the at least one identifier is received, the method 200 can proceed to block 208.

At block 208, the one or more identifiers are compared with one or more stored identifiers stored on the mobile device. For example, the processor 338 compares the at least one identifier from the visual voice mail server 268 with stored identifiers in one or more stored on the mobile device 100. The stored identifiers can be in one or more lists, one or more address books, one or more white lists, one or more black lists, or any combination thereof. The one or more address books can include one or more options or rules for handling visual voice mail messages from one or more contacts or phone numbers. The one or more address books can include a corporate address book, a personal contact address book or any address book associated with the mobile device 100. Each identifier or list can include one or more associated rules or policies. For example, a user can designate that all visual voice mail messages from the user's spouse be downloaded to the mobile device 100 and all visual voice mail messages from a specific telemarketer or anonymous sender be deleted from the visual voice mail server 368.

The address book or lists can also include contacts or phone numbers with one or more wildcards, or both. An example of a wildcard can be "800-\*\*\*-\*\*\*\*", thus all calls from 800 numbers can have associated rules such as a rule to delete the visual voice mail message. Similarly, each visual voice mail message from an anonymous sender, for example a blocked number, can include an associated rule or policy, such as a rule or policy to delete the visual voice mail message. The comparison can take several forms, such as comparing the phone number of the sending device with the phone numbers stored on the mobile device 100 or can compare a contact name associated with the sending device with contact names stored on the mobile device 100. After the processor 338 compares the at least one identifier with one or more stored identifiers the method 200 can proceed to block 210.

At block 210, a policy regarding the visual voice mail message can be implemented based on the rules in response to the comparison. For example, the processor 338 can automatically take action based on the comparison without requiring action from the user since the user has selected options in the address book, has created one or more lists, or any combination thereof for managing the visual voice mail message. The action can be requesting to implement a policy regarding the visual voice mail message using rules stored on the mobile device 100 in response to the comparison.

At block 212, the implemented policy can be requesting the download of the visual voice mail message to the mobile device with the visual voice mail message comprising a notification message and the associated message. For example, the processor 338 can request the visual voice mail server 368 to download the visual voice mail message to the mobile device 100. The visual voice mail message can be a notification message and one of the voice message, visual message, fax message, or system message. The notification message can include the time the visual voice mail message was stored, the date the visual voice mail message was store, the number of the device that stored the visual voice mail message, the name of the depositor of the visual voice mail message, and the length of visual voice mail message. The length of a voice mail message can include the number of seconds of a voice message or video message and the number of pages for a fax message. After requesting the download of the visual voice mail message to the mobile device 100, the method 200 can proceed to block 214.

At block 212, the implemented policy can be requesting the download of a notification message to the mobile device. For example, the processor 338 can request the visual voice mail server 368 to download a notification message without the voice message, visual message, fax message, or system message. The notification message can include the time the visual voice mail message was stored, the date the visual voice mail message was stored, the number of the device that stored the visual voice mail message, the name of the depositor of the visual voice mail message, and the length of visual voice mail message. The length of a voice mail message can include the number of seconds of a voice message or video message and the number of pages for a fax message. By not downloading the visual voice mail message, the user can access the voice message, video message, fax message, or system message at a later time. For example, the user can call the voice message service or can use the mobile device 100 to download the voice message, video message, fax message, or system message. After requesting the download of the notification message to the mobile device 100, the method 200 can proceed to block 214.

At block 212, the implemented policy can be requesting the maintaining of the visual voice message external to the mobile device. For example, the processor 338 can request the visual voice mail server 368 to maintain the visual voice mail message external to the mobile device 100. After requesting the maintaining of the visual voice mail message external to the mobile device 100, the method 200 can proceed to block 214.

At block 212, the implemented policy can be requesting the deletion of the visual voice message from the storage device external to the mobile device. For example, the processor 338 can request the visual voice mail server 368 to delete the visual voice mail message from the visual voice mail server 368 or one or more associated storage devices. The deletion of the visual voice mail message can take several forms and the request can indicate which form based on the associated rule. For example, the visual voice mail message can be marked to be deleted or can be deleted from the visual voice mail server 368 or one or more associated storage devices. After requesting the deletion of the visual voice mail message from the storage device external to the mobile device 100, the method 200 can proceed to block 216.

At block 212, the implemented policy can be requesting the visual voice mail message to be sent to the mobile device as an email message. For example, the processor 338 can request that the visual voice mail server 368 send the visual voice mail message to the mobile device 100 as an email message. The email message can include a notification message and one of the voice message, visual message, fax message, or system message. The notification message can include the time the visual voice mail message was stored, the date the visual voice mail message was stored, the number corresponding to the device that stored the visual voice mail message, the name of the depositor of the visual voice mail message, and the length of visual voice mail message. The length of a voice mail message can include the number of seconds of a voice message or video message and the number of pages for a fax message. After receiving the email message, the user can manage the email message which can include, but not limited to, leaving the email message in the inbox of the visual voice mail message application 366, moving the email message to an inbox within an email message application, or saving the email message on a computer or on a server communicatively coupled to the computer. After requesting the email message to be sent to the mobile device 100, the method 200 can proceed to block 214.

At block 212, the implemented policy can be requesting a download of a notification message to the mobile device and the deletion of the visual voice mail message from the visual voice mail server or one or more associated storage devices. For example, the processor 338 can request the visual voice mail server 368 to download a notification message and delete the visual voice mail message from the visual voice mail server 368 or associated storage devices. The notification message can include the time the visual voice mail message was stored, the date the visual voice mail message was stored, the number corresponding to the device that stored the visual voice mail message, the name of the depositor of the visual voice mail message, and the length of visual voice mail message. The length of a voice mail message can include the number of seconds of a voice message or video message and the number of pages for a fax message. The deletion of the visual voice mail message can take several forms and the request can indicate which form based on the associated rule. For example, the visual voice mail message can be marked to be deleted or can be deleted from the visual voice mail server 368 or one or more associated storage devices. After requesting the download of the notification message and the deletion of the visual voice mail message, the method 200 can proceed to block 216.

At block 214 the visual voice mail server 368 can implement the policy regarding the visual voice mail message in response to the request from the mobile device. For example, the visual voice mail server 368 can receive the request from the mobile device 100 and take action accordingly. In response to a request to download the visual voice mail message to the mobile device 100, the visual voice mail server 368 can send the visual voice mail message to the mobile device 100. The visual voice message can include a notification message and one of a voice message, visual message, fax message, or system message. In response to a request to download a notification message, the visual voice mail server 368 can send a notification message to the mobile device 100. In response to a request to maintain the visual voice mail message external from the mobile device 100, the visual voice mail server 368 can maintain the visual voice mail message. For example, the visual voice mail server 368 can do nothing (leave the visual voice mail message at a current storage location) or can move the visual voice mail message to an inbox associated with and external to the mobile device 100. In response to a request to delete the visual voice mail message, the visual voice mail server 368 can delete the visual voice mail message from the visual voice mail server 368 or from one or more associated storage devices. The deletion of the visual voice mail message can take several forms and the request can indicate which form based on the associated rule.

For example, the visual voice mail message can be marked for deletion or can be deleted from the visual voice mail server 368 or one or more associated storage devices. In response to a request to send the visual voice mail message to the mobile device 100 as an email message, the visual voice mail server 368 can send the visual voice mail message to the mobile device 100 as an email message. The email message can include a notification message and one of the voice message, visual message, fax message, or system message. In response to a request to download a notification message to the mobile device 100 and the deletion of the visual voice mail message from the visual voice mail server 368 or one or more associated storage devices, the visual voice mail server 368 can send the notification message to the mobile device 100 and can delete the visual voice mail message from the visual voice mail server 368 or from one or more associated storage devices. After the visual voice mail server 368 takes action in response to a request from the mobile device 100, the method can proceed to block 216, where the method 200 can end.

Although, the exemplary method 200 describes several different actions that can be taken, the exemplary method 200 is not limited to such actions or rules. For example, for a visual voice mail message such as a voice message that has a notification message sent but not downloaded, the visual voice mail message can also be marked. Such marking can be heard, unheard, or a similar marking. By marking a visual voice mail message such as a voice message as heard, if the user calls into a voice mail service, the voice message will be treated as a voice message but can be considered as not new. Thus, the user can choose to listen to the voice message by requesting to play all heard messages.

Figure 3:
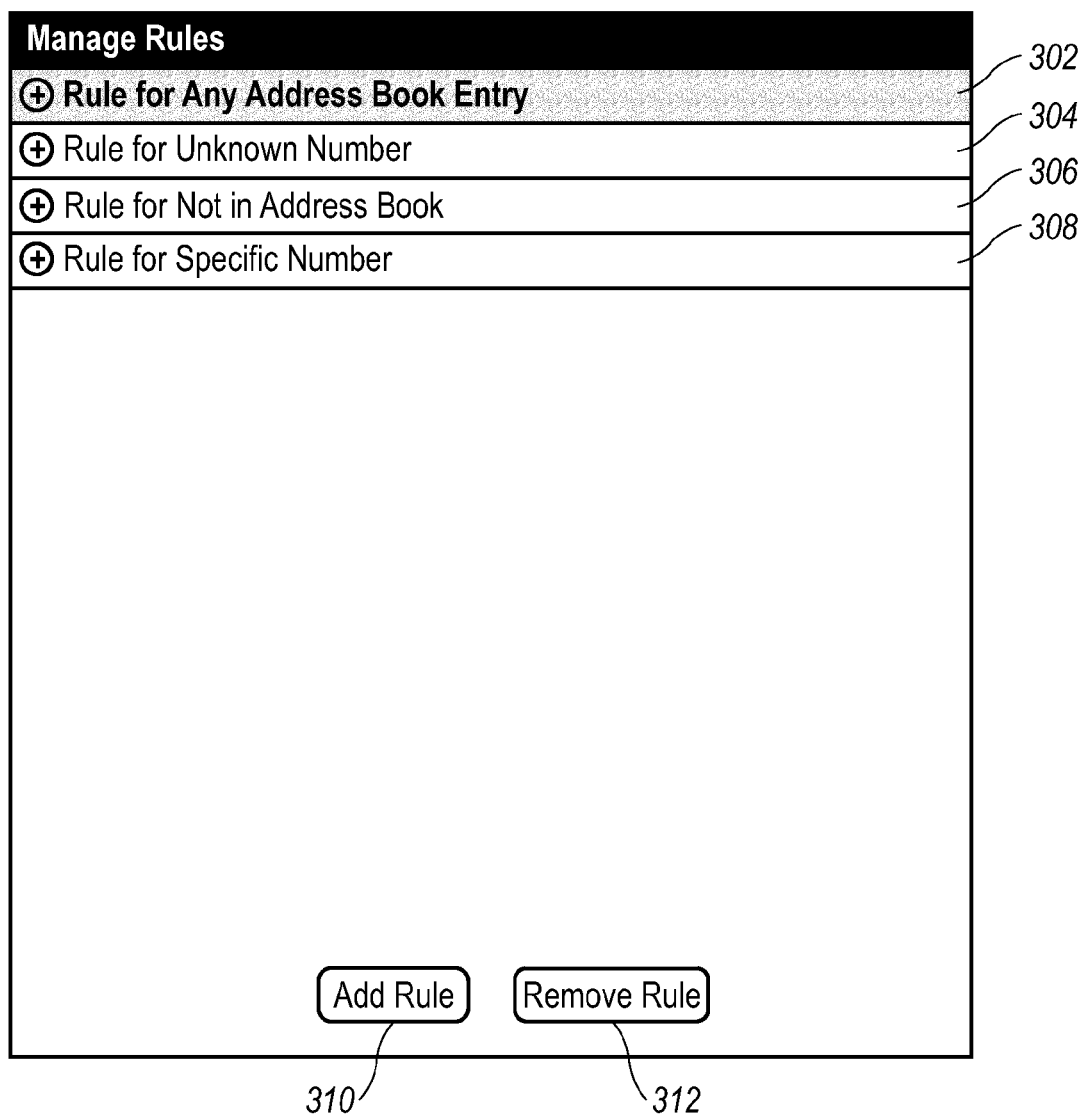
FIG. 3 is a screenshot of rules for managing visual voice mail messages for a visual voice mail message application in accordance with an exemplary embodiment of the disclosure.

Referring to FIG. 3, a screenshot of rules for managing visual voice mail messages for a visual voice mail message application in accordance with an exemplary implementation is illustrated. As shown, the screenshot 300 can include a rule for any address book entry 302, rule for unknown number 304, a rule for messages from senders not in address book 306, and rule for specific number 308. In one or more implementations, more or fewer rules for managing visual voice mail messages can be included. The rule for any address book entry 302 can manage how a visual voice mail message for a known identifier, such as a known phone number, is handled. The rule for unknown number 304 can manage how a visual voice mail message from an unknown identifier is handled. The rule for not in address book 306 can manage how a visual voice mail message from an identifier not in the address book is managed and can include anonymous identifiers, such as for messages from devices that block the provision of the number associated with the device. The rule for specific number 308 can control how a visual voice mail message from a known identifier, such as a contact not in the address book, is handled. For example, the visual voice mail message application 366 can include a list of one or more specific identifiers, such as telemarketers or headhunters, from whom the user does not want to receive visual voice mail messages. The list of specific numbers can be referred to as a black list. The screenshot 300 can include an option to add rule 310 and remove rule 312. The add rule 310 option can allow a user to add a rule for managing visual voice mail messages. The remove rule 312 option can allow a user to remove a rule, for example, rule for not in address book 306.

Figure 4:
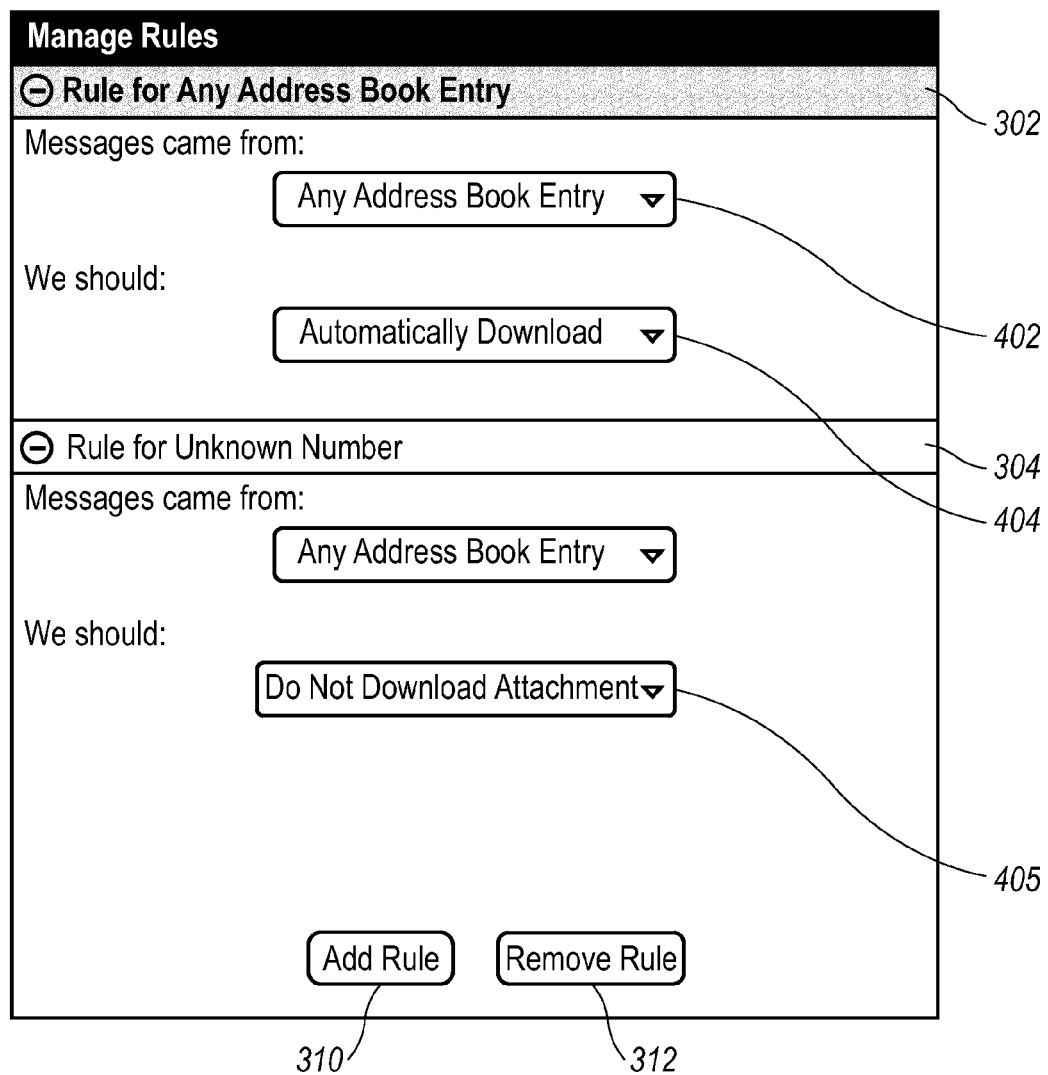
FIG. 4 is a screenshot of a rule for any address book entry for a visual voice mail message application in accordance with an exemplary embodiment of the disclosure.

Referring to FIG. 4, a screenshot of a rule for any address book entry for a visual voice mail message application in accordance with an exemplary implementation is illustrated. As shown, the screenshot 400 can include a rule for any address book entry 302 which manages visual voice mail messages from any address book entry 402. For example, automatically download 404 the visual voice mail messages. Also shown is a rule for unknown number 304 which can manage visual voice mail messages from an unknown number or unknown identifier 304. For example, do not download attachment 405, can send a notification message but not the voice message, video message, fax message, system message or a transcription of a voice message, video message or fax message. The screenshot 400 can include an option to add rule 310 and remove rule 312. The add rule 310 option can allow a user to add a rule for managing visual voice mail messages. The remove rule 312 option can allow a user to remove a rule, for example, a rule for not in address book 306.

Figure 5:
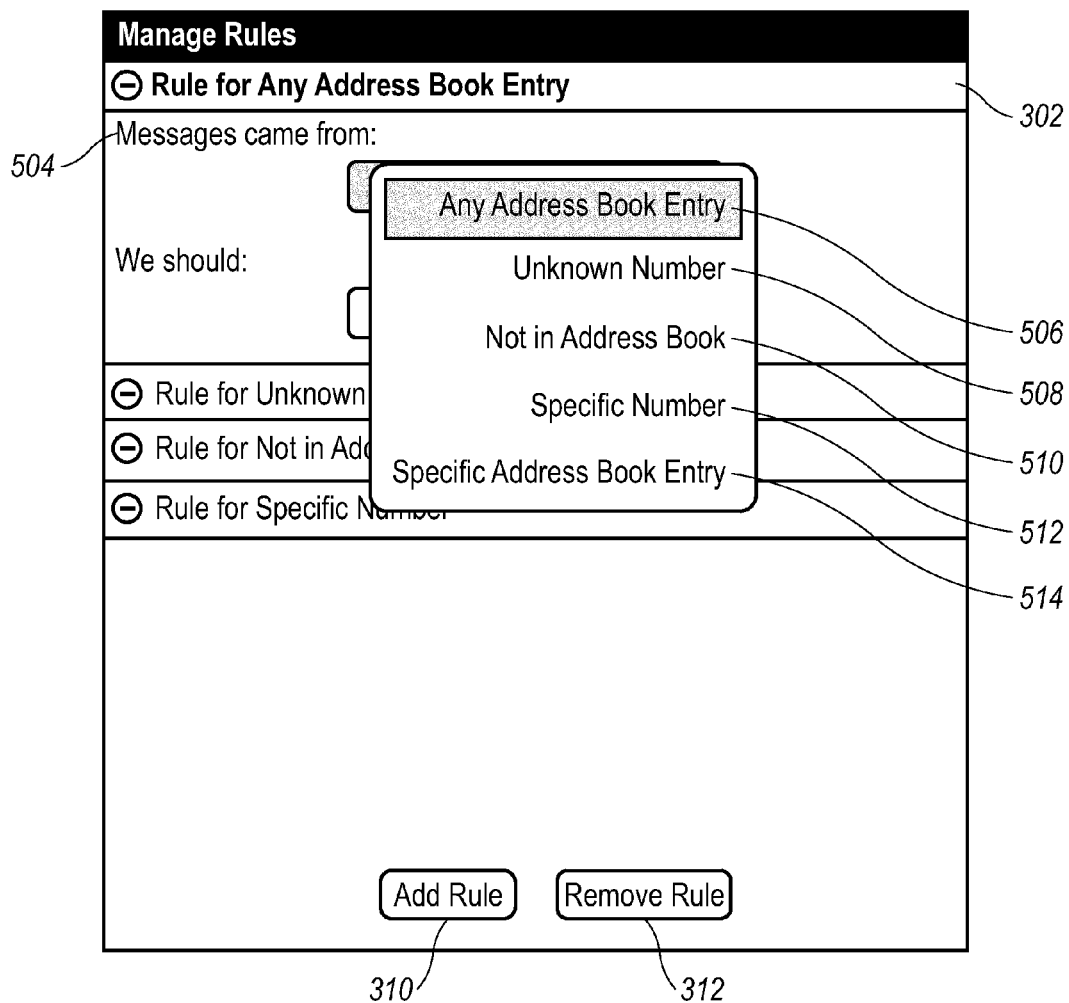
FIG. 5 is a screenshot of options for managing visual voice mail messages from any address book entry for a visual voice mail message application in accordance with an exemplary embodiment of the disclosure.

Referring to FIG. 5, a screenshot of options for managing visual voice mail messages from any address book entry for a visual voice mail message application in accordance with an exemplary implementation is illustrated. As shown, the screenshot 500 can include a pull down menu 402 for managing voice mail messages (messages came from) 504 which can include a variety of sources, for example, any address book entry 506, unknown number 508, not in address book 510, specific number 512, and specific address book entry 514. The screenshot 500 can include an option to add rule 310 and remove rule 312. The add rule 310 option can allow a user to add a rule for managing visual voice mail messages. The remove rule 312 option can allow a user to remove a rule, for example, rule for not in address book 306.

Figure 6:
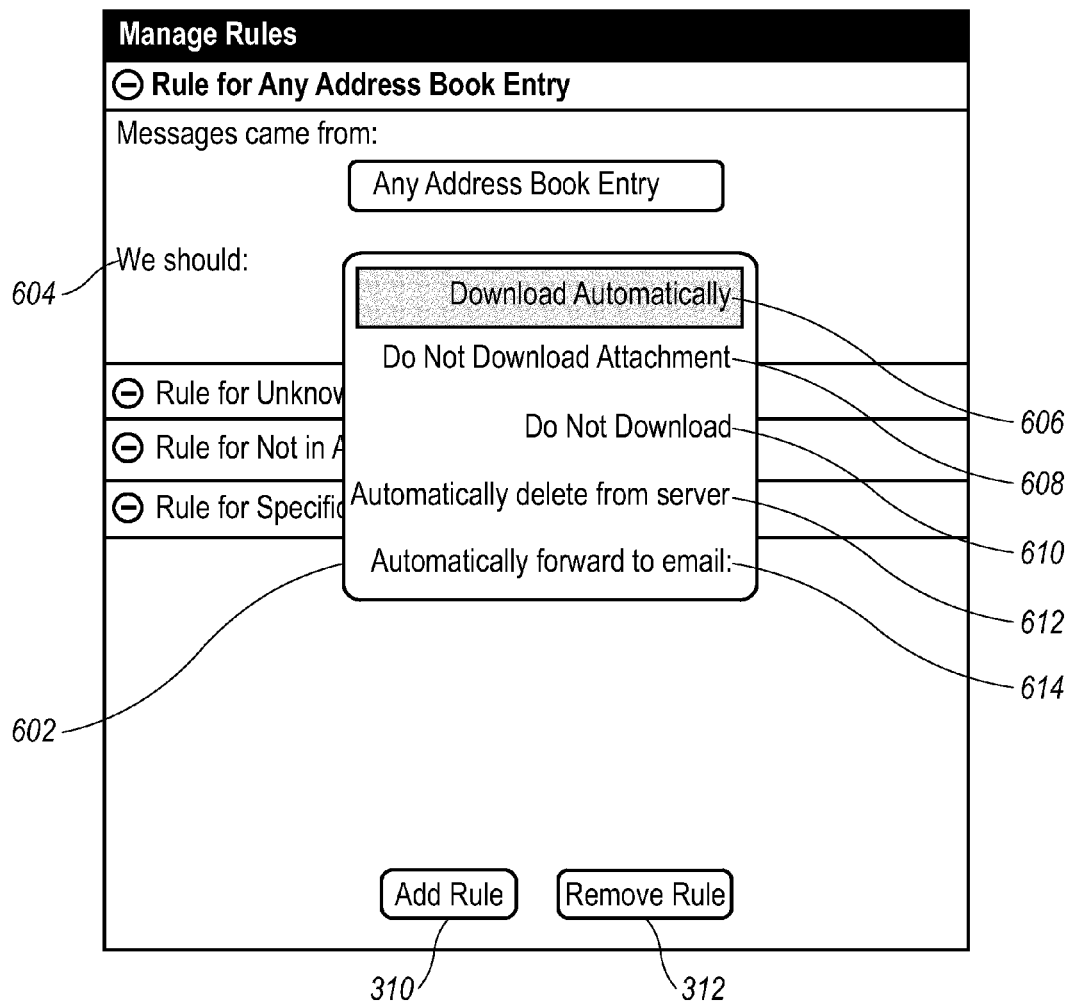
FIG. 6 is a screenshot of options for managing how to handle visual voice mail messages from any address book entry for a visual voice mail message application in accordance with an exemplary embodiment of the disclosure.

Referring to FIG. 6, a screenshot of options for managing how to handle visual voice mail messages from any address book entry for a visual voice mail message application in accordance with an exemplary implementation is illustrated. As shown, the screenshot 600 can include a pull down menu 602 for controlling what should be done (we should) 604 with the visual voice mail message. For example, automatically download 606, do not download attachment 608, do not download 610, automatically delete from server 612, and automatically forward to email 614. The automatically download attachment 606 option can automatically request the visual voice mail server 368 to download the visual voice mail message onto the mobile device 100 in response to the visual voice mail server 368 receiving a visual voice mail message. The do not download attachment 608 option can automatically request the visual voice mail server 368 to download a voice mail message comprising a notification message to the mobile device 100 but not the attachment, such as the voice message, video message, fax message, system message or a transcription of a voice message, video message or fax message. The notification message can include, but is not limited to, the time the visual voice mail message was stored, the date the visual voice mail message was stored, the number of the device that stored the visual voice mail message, the name of the depositor of the visual voice mail message, and the length of visual voice mail message. The length of a voice mail message can include the number of seconds of a voice message or video message and the number of pages for a fax message. The do not download 610 option can automatically request the visual voice mail server 368 to maintain the visual voice mail message on the visual voice mail server 368 or on the one or more storage devices associated with the visual voice mail server 368. The automatically delete from server 612 option can automatically request the visual voice mail server 368 to delete the visual voice mail message from the visual voice mail server 368 or the associated one or more storage devices. The automatically forward to email 614 option can automatically request the visual voice mail server 368 to forward the visual voice mail message to the mobile device 100 as an email message.

Figure 7:
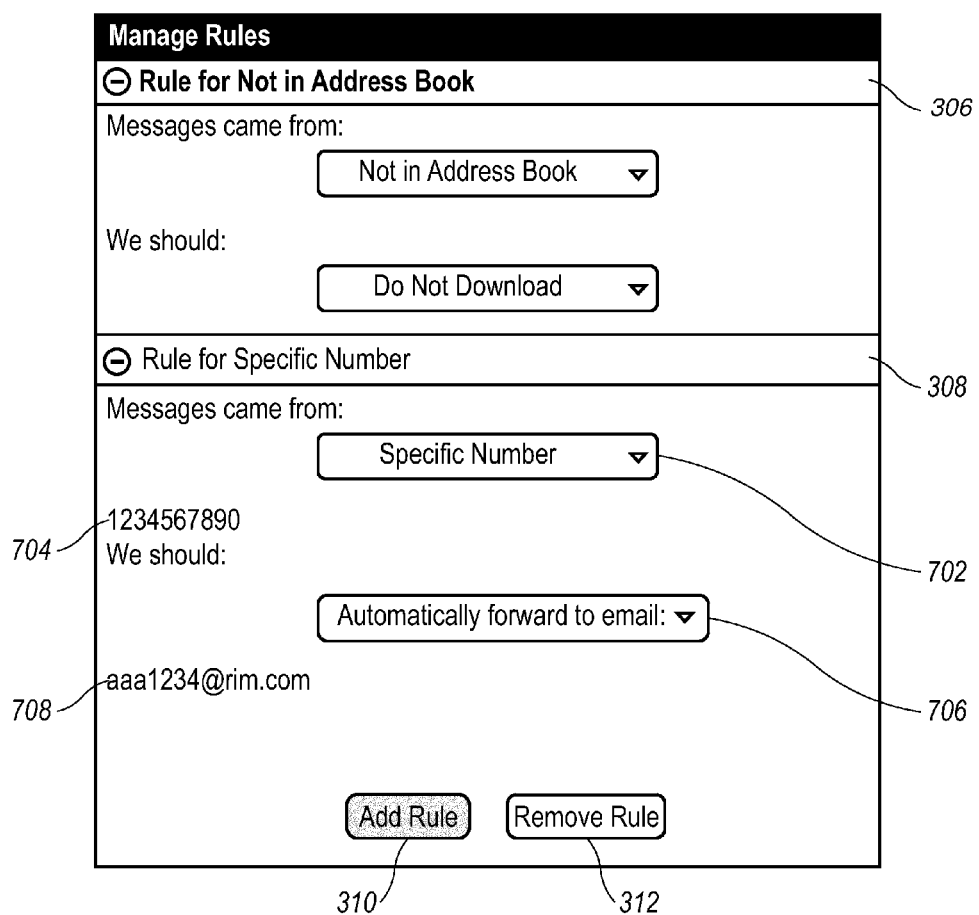
FIG. 7 is a screenshot of a rule for an address not in an address book for a visual voice mail message application in accordance with an exemplary embodiment of the disclosure.

Referring to FIG. 7, a screenshot of a rule for an address not in an address book for a visual voicemail message application in accordance with an exemplary implementation is illustrated. As shown, the screenshot 700 includes the rule for the specific number 308 option. For this example, if a voice message is received from a specific number 702: telephone number "1234567890" 704, then the voice message is automatically forwarded to email 706 to email address "aaa1234@rim.com" 708. As shown, the add rule 310 option is highlighted or designated to add this rule to the rules in the visual voice mail message application 366. The remove rule 312 option can allow a user to remove a rule. By adding the rule for the specific number, an option associated with the telephone number in the address book can be changed, the telephone number can be added to the white list, or the telephone number can be added to the black list. The same can be done for other identifiers, e.g., adding a rule for a specific contact.

Figure 8:
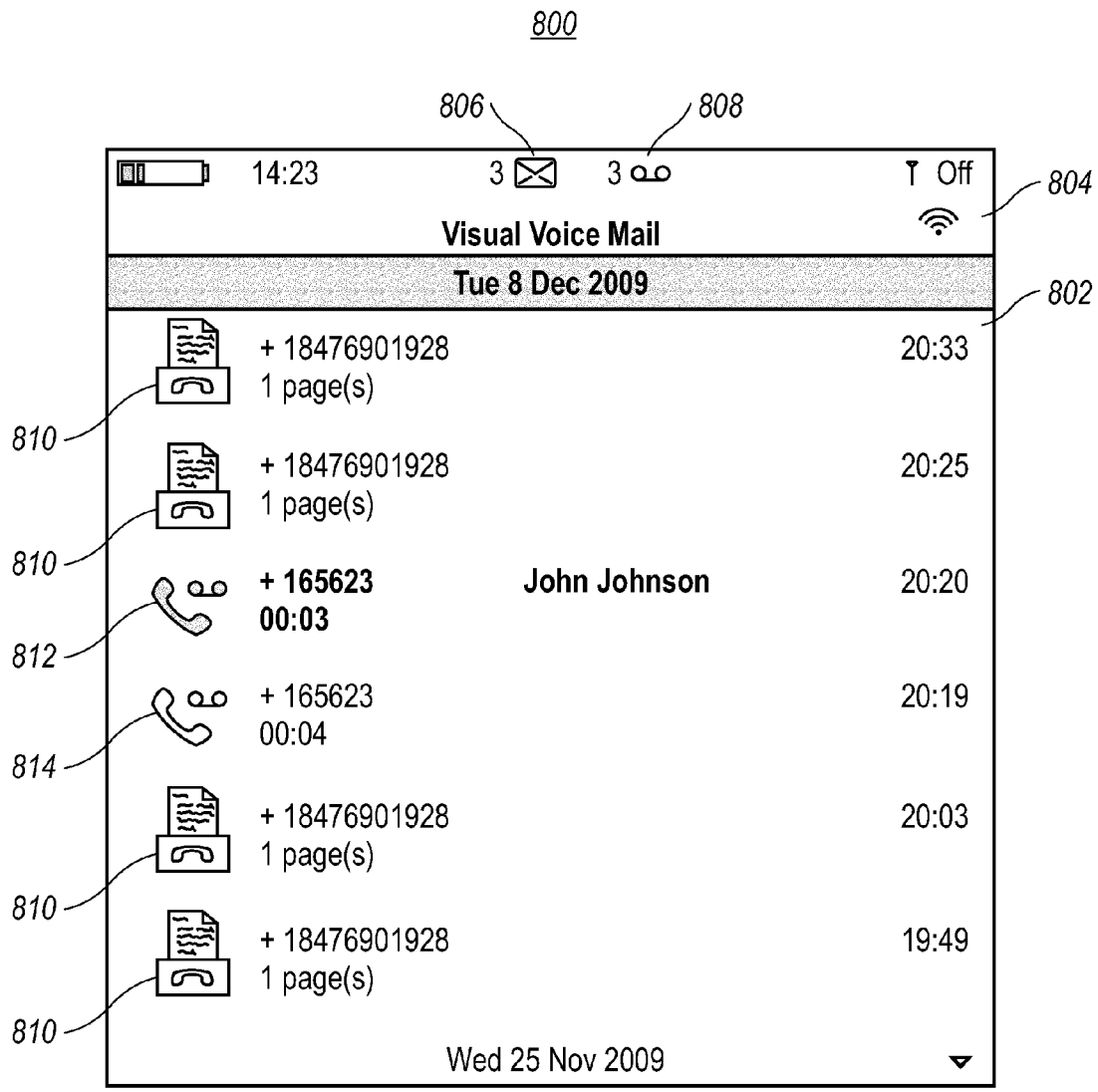
FIG. 8 is a screenshot of a list of visual voice mail messages for a visual voice mail message application in accordance with an exemplary embodiment of the disclosure.

Referring to FIG. 8, a screenshot of a list of visual voice mail messages for a visual voice mail message application in accordance with an exemplary implementation is illustrated. As shown, the screenshot 800 is a list of visual voice mail messages in the visual voice mail message inbox 802. As shown in a header 804 there are three new fax messages 806 and three new voice messages 808. In the screenshot 800, there are four read fax messages 810 and two voice messages 812, 814. One of the voice messages is indicated as new 812 and the other voice message is indicated as played 814. The new voice message 812 is from John Johnson which was received on Tuesday, Dec. 8, 2009 at 20:20 or 8:20 PM. The new voice message 812 is three seconds long. Although only fax messages 810 and voice messages 812, 814 are shown in the visual voice mail message inbox 802, the list can include voice messages, video messages, fax messages, system messages, transcriptions of voice messages, video messages, and fax messages, or any combination thereof.

Figure 9:
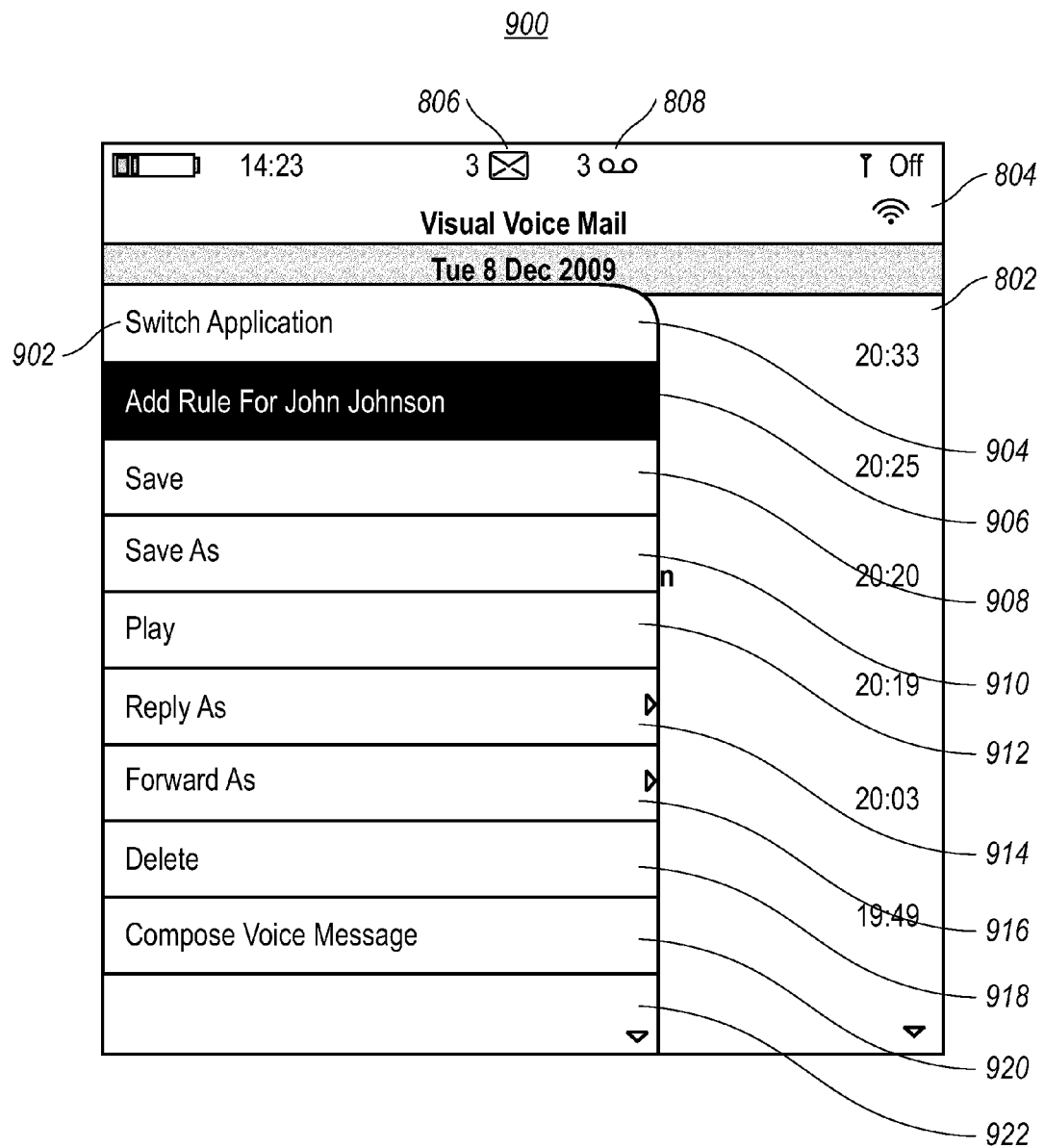
FIG. 9 is a screenshot of options for a visual voice mail message from a known contact who stored a visual voice mail message for a visual voice mail message application in accordance with an exemplary embodiment of the disclosure.

Referring to FIG. 9, a screenshot of options for a visual voice mail message from a known contact who stored a visual voice mail message for a visual voicemail message application in accordance with an exemplary implementation is illustrated. As shown, the screenshot 900 provides a menu 902 of options for managing a visual voice mail message, for example, a voice message 812 from John Johnson shown in FIG. 8. To have the menu 902 displayed, the user could click on the John Johnson visual voice mail message 812 shown in FIG. 8. In one or more implementations, the menu 902 can be displayed using other means. As shown, the menu 902 can include, but is not limited to, switch application 904, add rule for John Johnson 906, save 908, save as 910, play 912, reply as 914, forward as 916, delete 918, compose voice message 920, and see more options 922. The switch application 904 option can allow the user to switch to a different application. For example, the application can switch from the visual voice mail message application 366 to a non-visual voice mail message application, such as an email message application. The add rule for John Johnson 806 option can allow the visual voice mail message application 366 to generate a new rule to manage visual voice mail messages from John Johnson. For example, the visual voice mail message application 368 can cause a visual voice mail message comprising a notification message to be sent to the mobile device 100 without the voice message, the transcription of the voice message, or both. The save 908 option can store the visual voice mail message 812 with the same title elsewhere. For example, the voice message 812 can be stored elsewhere on the mobile device 100. The save as 910 option can store the voice message 812 with a new title. The play 912 option can allow the mobile device 100 to play the audio component of the voice message 812. The play 912 option can play the audio component of the voice message 812 that is stored on the mobile device 100 or stored on the visual voice mail server 368. The replay as 914 option can include a drop down menu providing a list of options for replying to the visual voice mail message. The drop down menu can include options including, but not limited to, play, pause, stop, and replay. The forward as 816 option can include a drop down menu providing a list of options for forwarding the visual voice mail message. The drop down menu can include options to forward as a visual voice mail message or forward as an email message. The delete 918 option can delete the visual voice mail message from the mobile device 100. The compose voice message 920 option can allow the user to compose a voice message to be sent to the device of the user who left a visual voice mail message, for example, John Johnson. The more options 922 option can show another drop down menu of additional options.

In one or more embodiments, the rules for managing visual voice mail messages can be set as defaults. An administrator associated with the mobile device 100 can set the initial settings of the rules. For example, for company provided mobile devices, an administrator or information technology personnel can set the initial settings of the rules. A user of the mobile device 100 can be permitted to change one or more of the settings. For example, to reduce costs, the initial settings can be set to only send notifications of visual voice mail messages from identifiers in the address book of the mobile device 100. Similarly, the initial settings can be set to delete all visual voice mail messages from identifiers for known telemarketers in a black list.

The system and method offer several advantages and benefits, including but not limited to, conserving memory, improving efficiency, saving money, and allowing users of the visual voice mail system more control over visual voice mail messages. For example, by allowing the user to only download a notification message to a mobile device, memory on the mobile device is saved. In addition, by not downloading the visual voice mail message to the mobile device, allows the user quicker access to stored visual voice mail messages because the amount of visual voice mail messages is less compared to systems that require all visual voice mail messages to be downloaded to a mobile device. In addition, depending on the pay plan for the mobile device, a user may be able to avoid surcharges for exceeding a memory allotment. The black list also assists in reducing the number of undesired visual voice mail messages.

The present disclosure can be embodied in other specific forms without departing from its spirit or essential characteristics. The described implementations are to be considered, in all respects, as illustrative only, and are in no way to be considered as restrictive. The scope of the disclosure is, therefore, indicated by the appended claims rather than by the foregoing description. All changes that come within the meaning and range of equivalency of the claims are to be embraced within their scope.

The invention claimed is:

1. A communications device comprising:
a processor; and
a non-transitory computer readable media storing machine readable instructions which, when executed by the processor, causes the communications device to:
receive at least one identifier associated with a sending device of a visual voice mail message, the at least one identifier includes a telephone number stored in an address book on the communications device and the visual voice mail message being stored external to the communications device;
compare the at least one identifier with one or more stored identifiers, each stored identifier having at least one rule associated with the identifier; and
implement a policy regarding the visual voice mail message based on the at least one rule, using a rule to:
request a download of the visual voice mail message to the communications device, the visual voice mail message comprising a notification message and one of a voice message, a visual message, a fax message, and a system message;
request a download of the notification message to the communications device, the notification message comprising information associated with the visual voice mail message;
request maintaining the visual voice mail message stored external to the communications device;
request deletion of the visual voice mail message stored external to the communications device;
request sending an email message to the communications device, the email message comprising the notification message and one of the voice message, the visual message, the fax message, and the system message; and
request both the download of the notification message to the communications device, the notification message comprising information associated with the visual voice mail message and the deletion of the visual voice mail message stored external to the communications device.

2. The communications device of claim 1, wherein the telephone number includes one or more wildcards.

3. The communications device of claim 1, wherein the address book includes an indicator as to which action is requested by the communications device based on the comparison.

4. The communications device of claim 1, wherein the at least one identifier is a telephone number associated with the sending device.

5. The communications device of claim 1, wherein the non-transitory computer readable media stores machine readable instructions which, when executed by the processor, causes the communications device to enable an administrator associated with the communications device to determine the at least one rule.

6. The communications device of claim 5, wherein the non-transitory computer readable media stores machine readable instructions which, when executed by the processor, causes the communications device to enable a user associated with the communications device to modify the at least one rule.

7. A communications device comprising:
a processor; and
at least one memory component storing one or more identifiers associated with at least one sending device and rules for handling one or more visual voice mail messages originating from the at least one sending device, the at least one memory component further storing instructions which, when executed by the processor, causes the communications device to:
receive at least one identifier associated with a sending device of a visual voice mail message, the at least one identifier includes a telephone number stored in an address book on the communications device and the visual voice mail message being stored external to the communications device;
compare the at least one identifier with each of the one or more stored identifiers, the one or more stored identifiers having at least one associated rule; and
implement a policy regarding the visual voice mail message based on the at least one associated rule, using a rule to:
request a download of the visual voice mail message to the communications device, the visual voice mail message comprising a notification message and one of a voice message, a visual message, a fax message, and a system message;
request a download of the notification message to the communications device, the notification message comprising information associated with the visual voice mail message;
request maintaining the visual voice mail message stored external to the communications device;
request deletion of the visual voice mail message stored external to the communications device;
request sending an email message to the communications device, the email message comprising the notification message and one of the voice message, the visual message, the fax message, and the system message; and
request both the download of the notification message to the communications device, the notification message comprising information associated with the visual voice mail message and the deletion of the visual voice mail message stored external to the communications device.

8. The communications device of claim 7, wherein the telephone number includes one or more wildcards.

9. The communications device of claim 7, wherein the address book includes an indicator as to which rule is requested by the communications device based on the comparison.

10. The communications device of claim 7, wherein the at least one identifier is a telephone number associated with the sending device.

11. The communications device of claim 7, wherein the at least one memory component further storing instructions which, when executed by the processor, causes the communications device to enable an administrator associated with the communications device to determine the at least one rule.

12. The communications device of claim 7, wherein the at least one memory component further storing instructions which, when executed by the processor, causes the communications device to enable a user associated with the communications device to modify the at least one rule.

13. A server comprising:
a processor; and
a non-transitory computer readable media storing machine readable instructions which, when executed by the processor, causes the server to:
send at least one identifier associated with a sending device of a visual voice mail message to a communications device, the at least one identifier includes a telephone number; and
receive a request from the communications device to implement a policy for handling the visual voice mail message based on at least one rule associated with the at least one identifier, using a rule to:
request a download of the visual voice mail message to the communications device, the visual voice mail message comprising a notification message and one of a voice message, a visual message, a fax message, and a system message;

request a download of the notification message to the communications device, the notification message comprising information associated with the visual voice mail message;
request maintaining the visual voice mail message stored external to the communications device;
request deletion of the visual voice mail message stored external to the communications device;
request sending an email message to the communications device, the email message comprising the notification message and one of the voice message, the visual message, the fax message, and the system message; and
request both the download of the notification message to the communications device, the notification message comprising information associated with the visual voice mail message and the deletion of the visual voice mail message stored external to the communications device.

* * * * *